(12) United States Patent
Maruyama et al.

(10) Patent No.: US 8,603,422 B2
(45) Date of Patent: Dec. 10, 2013

(54) GAS SEPARATION AND RECOVERY APPARATUS AND GAS SEPARATION AND RECOVERY METHOD

(75) Inventors: Masatoshi Maruyama, Nagoya (JP); Keiji Noda, Obu (JP); Yuuki Tarusawa, Kariya (JP); Yoshiaki Nishijima, Toyokawa (JP); Mitsuhiro Kanakubo, Sendai (JP); Takashi Makino, Sendai (JP); Tatsuya Umeki, Saga (JP); Hiroshi Nanjo, Miyagi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/441,141

(22) Filed: Apr. 6, 2012

(65) Prior Publication Data

US 2012/0258030 A1     Oct. 11, 2012

(30) Foreign Application Priority Data

Apr. 8, 2011    (JP) .................................. 2011-85990

(51) Int. Cl.
*B01D 53/56*      (2006.01)
*B01D 53/94*      (2006.01)

(52) U.S. Cl.
USPC ................ 423/212; 423/235; 60/282; 60/295

(58) Field of Classification Search
USPC .............. 423/212, 235; 422/168; 60/282, 295
See application file for complete search history.

(56) References Cited

U.S. PATENT DOCUMENTS

| 2,932,364 | A  | * | 4/1960  | Binter ............................ 423/212 |
| 8,012,438 | B2 | * | 9/2011  | Hutson et al. .................. 423/210 |
| 8,101,144 | B2 | * | 1/2012  | Sasson et al. .................. 423/210 |
| 2009/0136402 | A1 | * | 5/2009 | Heldebrant et al. ........... 423/210 |
| 2009/0291872 | A1 | * | 11/2009 | Bara et al. ...................... 510/175 |

FOREIGN PATENT DOCUMENTS

| JP | 2000-334259 | 12/2000 |
| JP | 2008-296211 | 12/2008 |

OTHER PUBLICATIONS

Yu, Hong et al., "Low viscosity amino acid ionic liquids with asymmetric tetraalkylammonium cations for fast absorption of $CO_2$", New Journal of Chemistry, (2009), 33, pp. 2385-2390.

Fukumoto, K. et al., "Room Temperature Ionic Liquids from 20 Natural Amino Acids", J. Am.Chem. Soc., (2005), 127, pp. 2398-2399.

Zhang, J. et al., "Supported Absorption of $CO_2$ by Tetrabutylphosphonium Amino Acid Ionic Liquids", Chem. Eur. J., (2006), 12, 4021-4026.

Gurkan, B. E. et al., "Equimolar $CO_2$ Absorption by Anion-Functionalized Ionic Liquids", J. Am. Chem. Soc., (2010), 132, pp. 2116-2117.

* cited by examiner

*Primary Examiner* — Timothy Vanoy
(74) *Attorney, Agent, or Firm* — Nixon & Vanderhye P.C.

(57) ABSTRACT

A gas separation and recovery apparatus that separates and recovers nitrogen oxides from a gas mixture includes: a liquid storing portion that stores a liquid, the liquid absorbing the nitrogen oxides; a gas-liquid contacting portion in which the liquid and the gas mixture contact with each other; and a liquid recovering portion that recovers the liquid after the liquid contacts the gas mixture. The liquid is an ionic liquid that chemically absorbs the nitrogen oxides.

8 Claims, 4 Drawing Sheets

FIG. 7

|  | NOx ABSORBING LIQUID | NO$_2$ CONC. (ppm) (N$_2$ BALANCE) | LIQUID TEMPERATURE |
|---|---|---|---|
| EM. 1 | [BMIM] [AcO] | 1900 | AMBIENT (15-20°C) |
| EM. 2 | [BMIM] [AcO] | 1900 | 100°C |
| CE. 1 | H$_2$O | 1900 | AMBIENT (15-20°C) |
| CE. 2 | [BMIM] [Tf$_2$N] | 959 | AMBIENT (15-20°C) |

US 8,603,422 B2

GAS SEPARATION AND RECOVERY APPARATUS AND GAS SEPARATION AND RECOVERY METHOD

CROSS REFERENCE TO RELATED APPLICATION

This application is based on Japanese Patent Application No. 2011-85990 filed on Apr. 8, 2011, the disclosure of which is incorporated herein by reference in its entirety.

TECHNICAL FIELD

The present disclosure relates to a gas separation and recovery apparatus and a gas separation and recovery method.

BACKGROUND

JP-A-2000-334259 describes an apparatus that carries out separation and recovery of nitrogen oxides (NOx) relative to gas exhausted from a chemical plant or car. The apparatus stores a liquid in a cleaning device, and the liquid is able to absorb a substance, such as NOx, to be separated and recovered. The NOx is removed from the exhausted gas by introducing the exhausted gas into the cleaning device and by agitating the liquid.

The apparatus further includes a cooling device that cools the liquid, so that the liquid is restricted from evaporating even when the exhausted gas has high temperature. Generally, the liquid, which absorbs NOx, is water or alkaline aqueous solution, for example.

However, when NOx is absorbed by the easily-evaporating liquid such as water or alkaline aqueous solution, such a cooling device is necessary for restricting the evaporation of the liquid, so that a size of the apparatus may be made larger. Moreover, the absorption density of NOx is not so much high in water or alkaline aqueous solution.

If the apparatus is applied to a car, for example, the car is required to be equipped with the large apparatus, which stores a large amount of the liquid, or the car is required to be frequently supplied with the liquid, so that the practical applicability may be low.

SUMMARY

It is an object of the present disclosure to provide a gas separation and recovery apparatus and a gas separation and recovery method, so as to suitably separate and recover NOx from a gas mixture.

According to a first example of the present disclosure, a gas separation and recovery apparatus that separates and recovers nitrogen oxides from a gas mixture includes a liquid storing portion, a gas-liquid contacting portion, and a liquid recovering portion. The liquid storing portion stores a liquid, which absorbs the nitrogen oxides. The gas-liquid contacting portion contacts the liquid and the gas mixture with each other. The liquid recovering portion recovers the liquid after the liquid contacts the gas mixture. The liquid is an ionic liquid that chemically absorbs the nitrogen oxides.

Accordingly, the nitrogen oxides can be separated and recovered from the gas mixture.

According to a second example of the present disclosure, a method of separating and recovering nitrogen oxides from a gas mixture includes: contacting an ionic liquid that chemically absorbs the nitrogen oxides with the gas mixture; and recovering the ionic liquid after the contacting.

Accordingly, the nitrogen oxides can be separated and recovered from the gas mixture.

BRIEF DESCRIPTION OF THE DRAWINGS

The above and other objects, features and advantages of the present disclosure will become more apparent from the following detailed description made with reference to the accompanying drawings. In the drawings:

FIG. 7 is a view illustrating detail conditions of the evaluation experiments.

DETAILED DESCRIPTION

A gas separation and recovery apparatus 20 will be described with reference to FIG. 1. The gas separation and recovery apparatus 20 purifies NOx contained in gas exhausted from a diesel engine of a vehicle such as car, and corresponds to a system for cleaning the gas exhausted from the engine.

Figure 1:
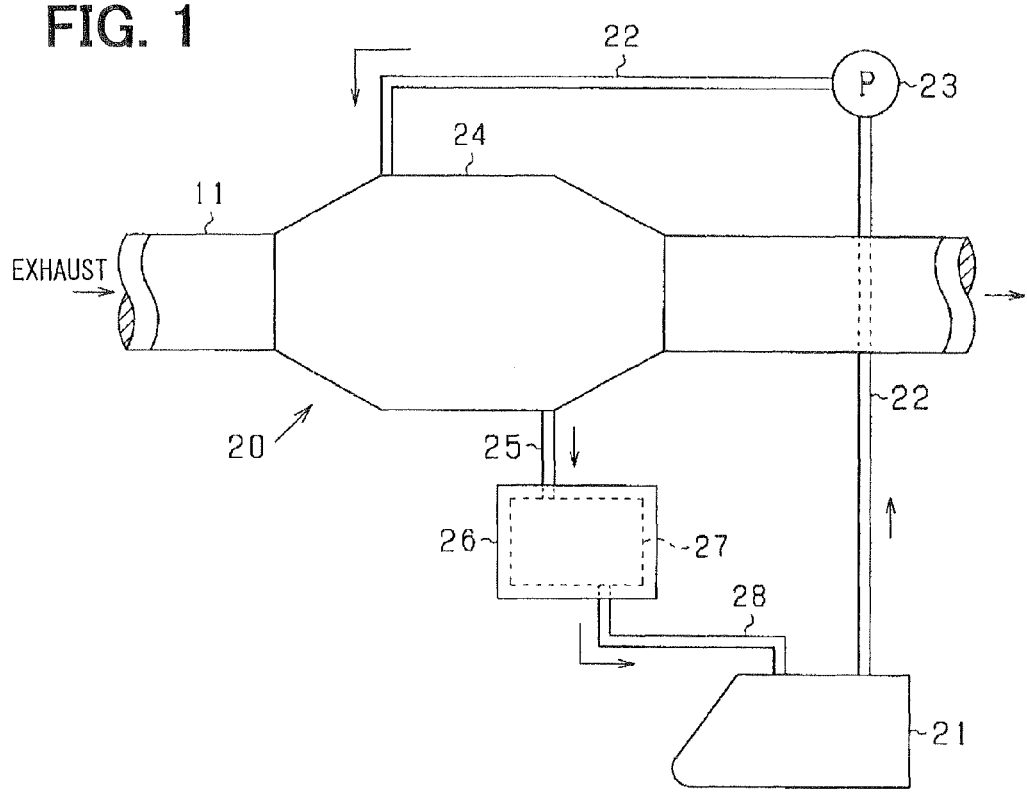
FIG. 1 is a schematic view illustrating a gas separation and recovery apparatus.

As shown in FIG. 1, an exhaust pipe 11 is connected to the engine, and defines an exhaust passage. The gas separation and recovery apparatus 20 is arranged in the exhaust pipe 11. The exhausted gas contains $CO_2$, NOx, and the like, and corresponds to a gas mixture.

The gas separation and recovery apparatus 20 is equipped with a tank 21. A NOx absorption liquid which is a liquid absorbing NOx is stored in the tank 21. The tank 21 is connected to a gas-liquid contact device 24 through a supply pipe 22. A circulation pump 23 is arranged in the middle of the supply pipe 22. The NOx absorption liquid stored in the tank 21 is supplied to the gas-liquid contact device 24 when the circulation pump 23 is driven.

The gas-liquid contact device 24 is arranged in the exhaust pipe 11. The exhausted gas flowing through the exhaust pipe 11 is introduced into the gas-liquid contact device 24, and the exhausted gas and the NOx absorption liquid contact with each other in the gas-liquid contact device 24. A construction of the gas-liquid contact device 24 is not limited.

The gas-liquid contact device 24 has a case in which the NOx absorption liquid is stored, for example. The exhausted gas is made to contact with the stored liquid through stirring, agitating or bubbling. Alternatively, the gas-liquid contact device 24 has a holder holding the NOx absorption liquid. The holder is supplied with both of the NOx absorption liquid and the exhausted gas, thereby contacting the liquid and the exhausted gas with each other. Furthermore, the NOx absorption liquid may be directly sprayed to the exhausted gas. In a gas-liquid contact process, the exhausted gas and the NOx absorption liquid are contact with each other in the gas-liquid contact device 24.

The gas-liquid contact device 24 is connected to a recovery device 26 through a recovery pipe 25. The NOx absorption liquid discharged from the gas-liquid contact device 24 is collected by the recovery device 26. A pump may be arranged in the recovery pipe 25, and the recovery of liquid may be performed by driving the pump. Alternatively, the recovery of liquid may be performed using gravity without the pump. In a liquid recovery process, the liquid after contacting with the exhausted gas is collected into the recovery device 26 through the recovery pipe 25.

A regenerator 27 is disposed in the recovery device 26, and regenerates the NOx absorption liquid after the recovery. The recovery device 26 regenerates the liquid by separating the NOx component from the collected liquid. For example, the collected liquid is regenerated using chemical treatment, heat treatment, electric treatment, or the like. The regenerated liquid is returned to the tank 21 through a pipe 28, and is reused.

Next, the NOx absorption liquid used in the above-mentioned system will be explained in detail. In this system, an ionic liquid which is able to chemically absorb NOx is used as the NOx absorption liquid. The NOx contained in the exhausted gas is separated and recovered by the ionic liquid.

A specific ionic liquid, which is able to chemically absorb the NOx, performs NOx absorption through a cation or an anion. Specifically, the ionic liquid may be a salt consisting of a cation having an amino group, amino-acid salt, or carboxylic salt, for example.

The salt consist of a cation having an amino group may be a salt in which at least one amino group is combined with an alkyl chain such as alkyl ammonium, alkyl pyridinium, alkyl pyrrolidinium, alkyl phosphonium, or alkyl imidazolium. In this case, the anion is not limited in particular. For example, the anion may be $Cl^-$, $Br^-$, $I^-$, $PF_6^-$, $BF_4^-$, $p\text{-}CH_3\text{—}C_6H_4SO_3^-$, $CF_3SO_3^-$, $(CF_3SO_2)_2N^-$, $(NC)_2N^-$, $(CF_3SO_2)_3C^-$, $CF_3CF_2SO_3^-$, $(CF_3CF_2SO_2)_2N^-$, $(CF_3CO)_2N^-$, $(CF_3SO_2)N(COCF_3)^-$, $(CH_3O)_2POO^-$, $CH_3SO_3^-$, $CF_3BF_3^-$, $HSO_4^-$, $C_2H_5OSO_3^-$, $CH_3(OCH_2CH_2)_2OSO_3^-$, $FeCl_4^-$, $(FSO_2)_2N^-$, $(FSO_2)(CF_3SO_2)N^-$, $(CF_3SO_2)(CF_3CF_2SO_2)N^-$, $(NC)_4B^-$, $(NC)_3C^-$, $SCN^-$, $(CF_3)_3PF_3^-$, $(C_2F_5)_3PF_3^-$, or the like.

The amino-acid salt is a salt having an anion (negative ion) originating from amino-acid (amino-acid ion), for example, may be acidic amino-acid such as aspartic acid or glutamic acid; basic amino-acid such as lysine, arginine or histidine; neutral amino-acid such as glycine, alanine (α-alanine, (β-alanine), phenylalanine, asparagine, cysteine, glutamine, isoleucine, leucine, methionine, proline, serine, threonine, tryptophan, thyrosin or valine; or N-acylamino acid such as N-benzoylalanine, N-acetylphenylalanine, or N-acetylglycine.

The carboxylic salt having an anion expressed with a formula of "R—COO$^-$" (carboxylic ion) is not limited. As the carboxylic ion, R in the above formula may be hydrogen atom, alkyl group, alkenyl group, or aryl group, or the carboxylic ion may be those derivatives, for example.

When R in the above formula is an alkyl group, the carbon number is desirably 1 to 10. In this case, the carboxylic ion may be acetate ion ($CH_3COO^-$), propionic acid ion ($CH_3CH_2COO^-$), butanoic acid ion ($CH_3(CH_2)_2COO^-$), octanoic acid ion ($CH_3(CH_2)_6COO^-$), decanoic acid ion ($CH_3(CH_2)_8COO^-$), or the like, for example.

When R in the above formula is an alkenyl group, the carbon number is desirably 2 to 10. In this case, the carboxylic ion may be $C_2H_3COO^-$, $C_3H_5COO^-$, $C_4H_7COO^-$, $C_8H_{15}COO^-$, or the like, for example.

When R in the above formula is an aryl group, the carbon number is desirably 6 to 10. In this case, the carboxylic ion may be benzoic acid ion ($C_6H_5COO^-$) or the like, for example.

As the above-mentioned derivatives, in each of the exemplary carboxylic ions, at least one hydrogen atom combined with a carbon atom may be substituted by, for example, fluorine atom, amino group, hydroxyl group, cyano group, nitro group, thiol group, sulfa group, cyclic disulfide, or the like. Alternatively, at least one methylene group may be substituted by, for example, ether group, ester group, carbonyl group, or the like.

Specifically, trifluoroacetic acid ion, pentafluoropropionic acid ion, 2-pyrolidone-5-carboxylate ion, salicylate ion, α-lipoic acid ion, lactic acid ion, tartrate ion, hippuric acid ion, N-methylhippuric acid ion, or the like may be used, for example.

The cation constructing the amino acid salt or the carboxylic slat is not limited in particular. For example, various cations such as $4^{th}$-class ammonium, pyridinium, pyrrolidinium, phosphonium, or imidazolium are applicable. If imidazolium is selected as the cation, for example, the salt may 1-butyl-3-methylimidazolium, 1-ethyl-3-methylimidazolium, 1-hexyl-3-methylimidazolium, 1-alkyl-3-(3-cyanopropyl)imidazolium, 1-methoxyethyl-3-methylimidazolium, for example.

The above-mentioned specific ionic liquid may be carboxylic salt, because the absorption density of NOx of the carboxylic salt is higher than that of water or other ionic liquids (for example, [BMIM][Tf$_2$N]), and because the absorption density of NOx (especially $NO_2$) of the carboxylic salt is higher than the absorption density of $CO_2$ of the carboxylic salt.

Moreover, the carboxylic salt may desirably be a salt which consists of an anion expressed with a formula of "$C_nH_{2n+1}COO^-$ (n is an integer of 0-10)" (alkyl carboxylate ion) or its derivative. A salt which consists of an alkyl carboxylate ion may be more desirable.

As the NOx absorption liquid of the gas cleaning system, only one sort of the exemplary ionic liquid may be used, or two or more sorts of the exemplary ionic liquids may be used in the combination.

The NOx absorption liquid may contain only the specific ionic liquid, or may further contain another liquid other than the specific ionic liquid (for example, another ionic liquid other than the specific ionic liquid).

The NOx to be absorbed by the specific ionic liquid includes various nitrogen oxides such as NO, $NO_2$, $N_2O$, $N_2O_3$, $N_2O_4$, and $N_2O_5$. Among these, especially $NO_2$ may be desirable.

The specific ionic liquid or a liquid containing the specific ionic liquid is made to contact the gas containing NOx, so as to separate the NOx in the gas-liquid contact device 24. Temperature condition and pressure condition are suitably set for the contacting. For example, the contacting is performed with a temperature condition higher than $-80°$ C. and equal to or lower than $300°$ C. and a pressure condition higher than 0 MPa and equal to or lower than 50 MPa.

It is possible to perform the NOx absorption in the large temperature range and the large pressure range because the ionic liquid hardly has a vapor pressure and because the ionic liquid has the wide liquid temperature range.

The temperature condition and the pressure condition are not limited when the ionic liquid is collected after the contacting performed in the gas-liquid contact device 24. When the ionic liquid, which chemically absorbs the NOx, is used as the NOx absorption liquid, it is not necessary to make the pressure of the ionic liquid high after the contacting with the exhausted gas. Therefore, the state where the large amount of NOx is absorbed under ordinary pressure can be maintained stably.

In a case where the specific ionic liquid is used as the NOx absorption liquid, the regenerator 27 may include a heater that heats the ionic liquid collected from the gas-liquid contact device 24, and the heater heats the liquid. Alternatively, the regenerator 27 may include a pair of electrodes dipped in the collected ionic liquid, and the NOx is reduced and purified by applying voltage between the pair of electrodes. Alternatively, the regenerator 27 may include a column filled with ion exchange resin, and the ionic liquid collected from the gas-liquid contact device 24 is made to pass the column. Alternatively, the regenerator 27 may include a container having ion exchange resin, and the ionic liquid collected from the gas-liquid contact device 24 is agitated in the container so as to mix the ionic liquid with the resin.

Advantages will be described below.

Because the ionic liquid is used as the NOx absorption liquid, the liquid hardly evaporates even under high-temperature environment. Therefore, the separation and recovery of the NOx can be suitably performed without extra equipment such as liquid cooling device. Further, because the separation and recovery of the NOx is performed using the chemical absorption property of the ionic liquid, extra equipment for maintaining the high-pressure state is unnecessary. Thus, the state where the large amount of NOx is absorbed under ordinary pressure can be maintained stably. As a result, a size of the apparatus can be made smaller.

When the carboxylic salt is used as the ionic liquid, the NOx absorption can be suitably achieved, compared with a case where water or $CO_2$ absorption ionic liquid (for example, [BMIM][$Tf_2N$]) is used. Therefore, it is unnecessary that the vehicle carries a large amount of the liquid or that the liquid is exchanged frequently for the vehicle.

Moreover, in the ionic liquid consisting of the carboxylic salt, the absorption density of NOx is higher than the absorption density of $CO_2$. Therefore, the NOx absorption can be efficiently performed in a gas mixture containing $CO_2$ and NOx.

After the contacting with the exhausted gas, the collected ionic liquid can be easily regenerated by the regenerator 27, so that the NOx absorption liquid can be repeatedly used. Thus, the frequency for exchanging or charging the liquid can be reduced.

The present disclosure is not limited to the above description. Changes and modifications are to be understood as being within the scope of the present disclosure.

The regenerator 27 is not limited to be arranged between the gas-liquid contact device 24 and the tank 21. The regenerator 27 may be omitted, and the NOx absorption liquid collected from the device 24 may directly return to the tank 21. In this case, the NOx absorption liquid collected from the gas-liquid contact device 24 is regenerated or exchanged, for example, per predetermined time period or predetermined drive distance.

The gas separation and recovery apparatus 20 may be applied to a gasoline engine instead of the diesel engine. Further, the present disclosure may be applied to a gas mixture discharged from a marine vessel, a thermal power plant, a steel plant, a chemical plant, or the like.

Hereafter, the present disclosure will be more specifically described using a first embodiment, a second embodiment, a first comparison example, and a second comparison example. However, the present invention is not restricted to the embodiments.

Figure 2:
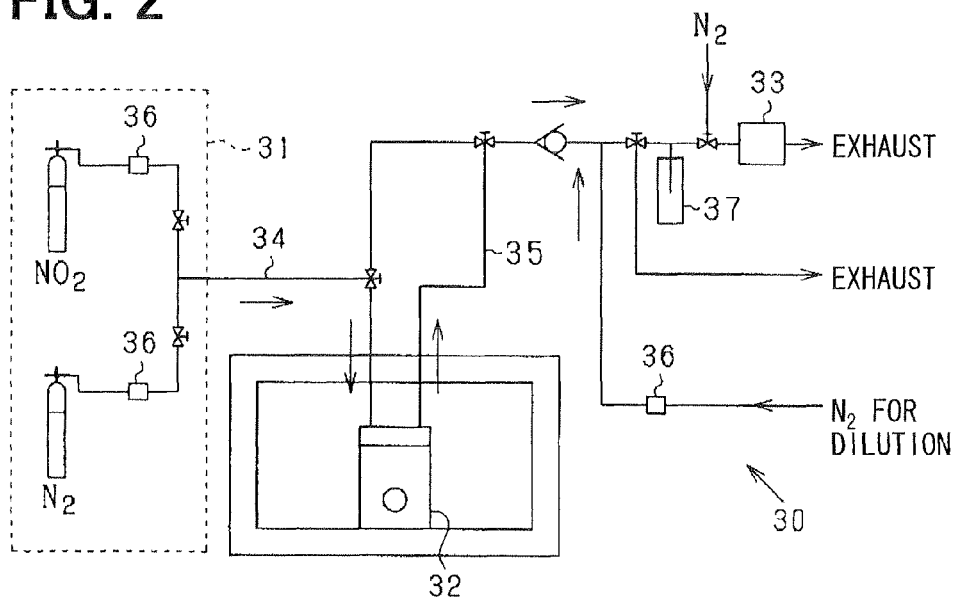
FIG. 2 is a schematic view illustrating an evaluation device used for evaluating NOx absorbing property of the gas separation and recovery apparatus.

Evaluation of NOx absorption performance is performed by the following methods. An evaluation device 30 used for the evaluation is schematically shown in FIG. 2. In addition, a series of operations shown below are performed under ordinary pressure.

The evaluation device 30 includes a gas producer 31, a container 32, and a gas analysis meter 33. The gas producer 31 generates a gas mixture. The NOx absorption liquid is accommodated in the container 32. The gas analysis meter 33 analyzes concentrations of gas components.

As shown in FIG. 2, the gas producer 31 produces a gas mixture containing $NO_2$ gas and $N_2$ gas, and the gas mixture is sent into the liquid in the container 32 through an exhaust pipe 34 with a gas flow rate of 0.9 L/min. At this time, the NOx absorption liquid of 10 mL is in the container 32. The gas supply to the liquid is performed by bubbling. In FIG. 2, an equipment 36 represents a flow rate controlling meter.

As shown in FIG. 7, [BMIM][AcO], $H_2O$ and [BMIM][$Tf_2N$] are tested as the NOx absorption liquid. Conditions for the evaluations, such as $NO_2$ concentration in the gas mixture or temperature of the NOx absorption liquid are also shown in FIG. 7.

[BMIM][AcO] represents 1-butyl-3-methylimidazolium acetate, and [BMIM][$Tf_2N$] represents 1-butyl-3-methylimidazolium bis(trifluoromethanesulfonyl)amide.

Gas in the container 32 is collected through a pipe 35, and the $NO_2$ concentration in the collected gas is measured by the gas analysis meter 33. In addition, an equipment 37 is arranged to trap water, for example. Analysis results of the gas analysis meter 33 are shown in FIGS. 3-6.

When the $NO_2$ concentration is measured, $N_2$ gas for dilution is introduced into the middle of the pipe 35 which connects the container 32 to the gas analysis meter 33. Ten times dilution is conducted for the first embodiment, the second embodiment and the first comparison example. Five times dilution is conducted for the second comparison example.

FIGS. 3-6 show the evaluation results in the diluted state. Moreover, broken lines in FIGS. 3-6 show measurement result when the gas mixture is made to directly flow from the gas producer 31 to the gas analysis meter 33 without passing through the container 32.

Figure 3:
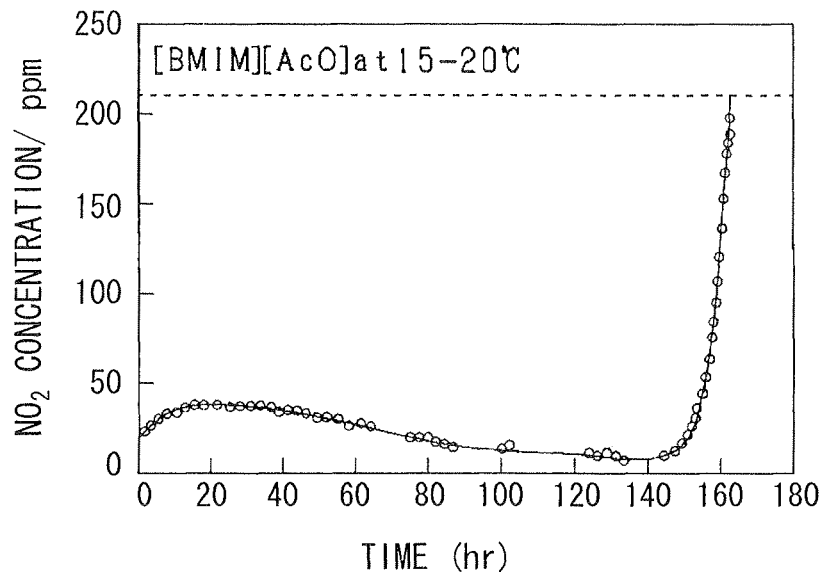
FIG. 3 is a graph illustrating an evaluation result of NOx absorbing property according to a first embodiment.

In the first embodiment, [BMIM][AcO] is used as the NOx absorption liquid, and the temperature of the liquid is set at a room temperature (15-20° C.). As shown in FIG. 3, the $NO_2$ concentration in the gas after the contacting with the absorption liquid is low such as about 10-40 ppm, and the $NO_2$ low state is maintained long such as about 140 hours. At this time, the $NO_2$ absorption density is 330 g/L, which is calculated based on FIG. 3.

Figure 4:
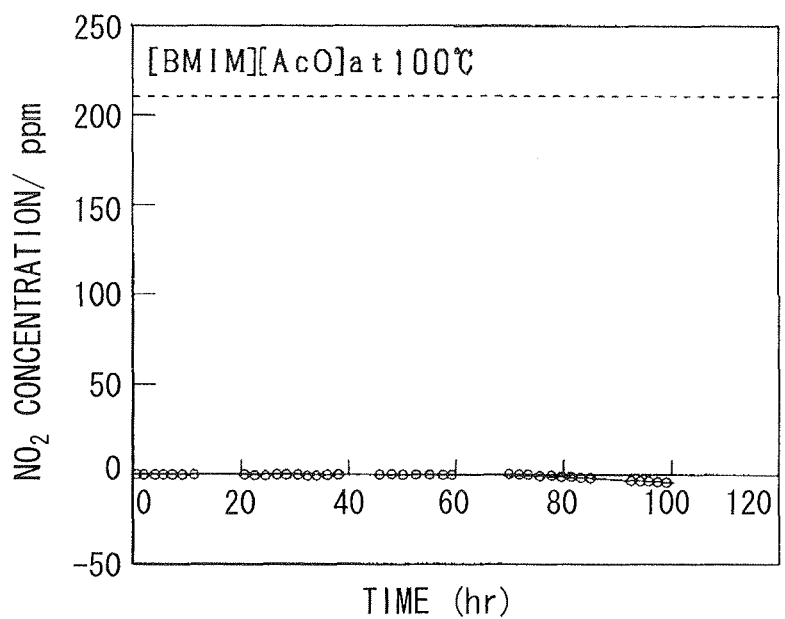
FIG. 4 is a graph illustrating an evaluation result of NOx absorbing property according to a second embodiment.

In the second embodiment, [BMIM][AcO] is used as the NOx absorption liquid, and the temperature of the liquid is set at 100° C. As shown in FIG. 4, the $NO_2$ concentration is maintained low as about 0 ppm for 100 hours or more.

Figure 5:
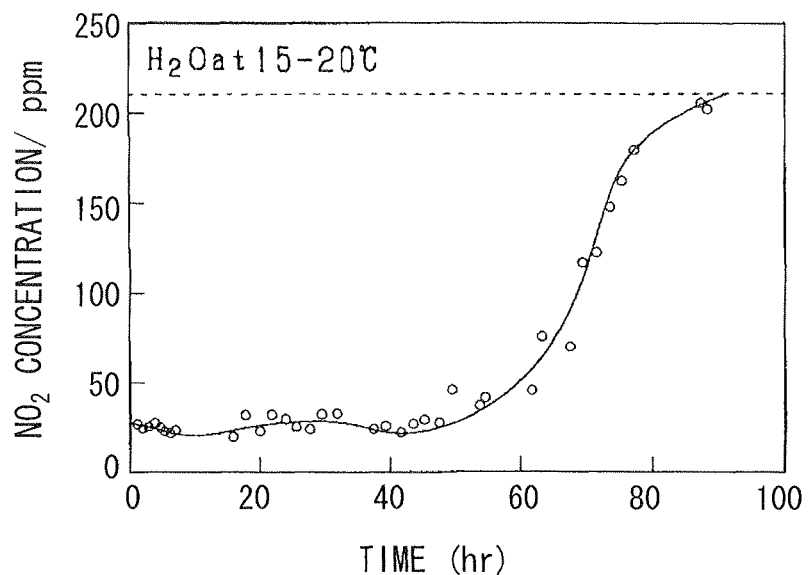
FIG. 5 is a graph illustrating an evaluation result of NOx absorbing property according to a first comparison example.

In the first comparison example, water is used as the NOx absorption liquid, and the temperature of the liquid is set at a room temperature (15-20° C.). As shown in FIG. 5, the $NO_2$ concentration in the gas after the contacting is low such as about 20-25 ppm for a while. However, the $NO_2$ concentration is gradually raised after elapse of about 50 hours from the start of the contacting, and is saturated in about 80 hours from the start of the contacting. The $NO_2$ absorption density of water is 140 g/L, which is calculated based on FIG. 5, so that the $NO_2$ absorption density of water is ½ or less of the $NO_2$ absorption density of [BMIM][AcO]. That is, the $NO_2$ absorption density of [BMIM][AcO] is about 2.4 times of the $NO_2$ absorption density of water.

Figure 6:
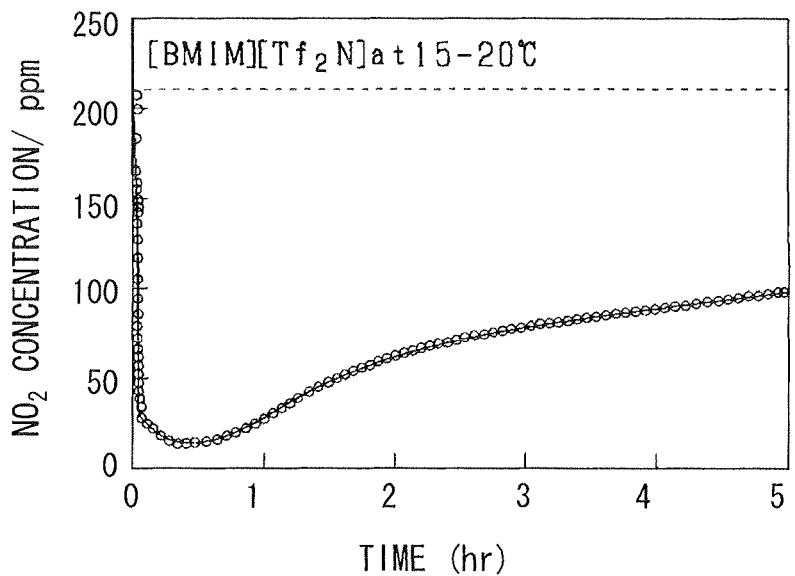
FIG. 6 is a graph illustrating an evaluation result of NOx absorbing property according to a second comparison example.

In the second comparison example, [BMIM][Tf$_2$N] is used as the NOx absorption liquid, and the temperature of the liquid is set at a room temperature (15-20° C.). As shown in FIG. 6, the NO$_2$ concentration is about 20 ppm immediately after the start of the contacting. However, the NO$_2$ concentration goes up immediately, and becomes high as about 100 ppm after elapse of 5 hours.

According to the present disclosure, the NOx separation and recovery is conducted using the chemical absorption by the ionic liquid.

The gas separation and recovery apparatus that separates and recovers nitrogen oxides from a gas mixture containing at least the nitrogen oxides includes a liquid storing portion, a gas-liquid contacting portion, and a liquid recovering portion. The liquid storing portion stores a liquid, and the liquid absorbs the nitrogen oxides. The gas-liquid contacting portion causes the liquid and the gas mixture to contact with each other. The liquid recovering portion recovers the liquid after the liquid contacts the gas mixture. The liquid is an ionic liquid that chemically absorbs the nitrogen oxides.

The ionic liquid hardly evaporates under high-temperature environment, so that the NOx separation and recovery can be effectively conducted without a cooling device for cooling the liquid. Further, the NOx absorption amount of the ionic liquid per unit is large, that is, the NOx absorption density is high. Therefore, the ionic liquid has better NOx absorption property.

If the NOx is not chemically but physically absorbed, the NOx absorbed by the ionic liquid easily goes away from the liquid. In this case, the ionic liquid after the contacting is required to continue to have high-pressure state so as to maintain the state where the large amount of NOx is absorbed in the liquid.

In contrast, when the NOx is chemically absorbed, the state where the large amount of NOx is absorbed in the ionic liquid can be stably maintained under ordinary pressure, so that extra device for pressurizing is unnecessary. Thus, the size of the gas separation and recovery apparatus can be maintained as small, and the NOx contained in the gas mixture can be adequately separated and recovered.

The ionic liquid may include —COO$^-$ as anion, so that carboxylic salt may be used for the ionic liquid. Further, the ionic liquid may include at least one sort of anion selected from a group consisting of C$_n$H$_{2n+1}$COO$^-$ (n is an integer of 0-10) and its derivative.

The ionic liquid consisting of the carboxylic salt has large NOx absorption amount per unit, compared with water or [BMIM][Tf$_2$N] representing 1-butyl-3-methylimidazolium bis(trifluoromethanesulfonyl)amide, that has better CO$_2$ absorption property, for example. Therefore, the ionic liquid consisting of the carboxylic salt is suitably used as the NOx absorption liquid.

Further, the NOx absorption density of the ionic liquid consisting of the carboxylic salt is higher than the CO$_2$ absorption density of the ionic liquid consisting of the carboxylic salt. Therefore, the ionic liquid consisting of the carboxylic salt can efficiently absorb the NOx from a gas mixture containing both of CO$_2$ and NOx.

The gas separation and recovery apparatus may further include a regenerating portion that regenerates the ionic liquid recovered by the liquid recovering portion. In a conventional art, when NOx is absorbed by water or alkali aqueous solution such as NaOH aqueous solution or NH$_3$ aqueous solution, the NOx is absorbed by water as nitric acid. In this case, it is difficult to regenerate the NOx absorption liquid.

In contrast, when the ionic liquid that chemically absorbs the NOx is used, the regeneration of the ionic liquid can be easily conducted using ion exchange treatment, heat treatment or electrochemical treatment. Thus, the NOx absorption liquid can be repeatedly used.

The gas separation and recovery apparatus may be applied to a system cleaning gas exhausted from an engine of a vehicle. In this case, the gas-liquid contacting portion contacts the liquid and the exhausted gas with each other, and the liquid recovering portion recovers the liquid after the liquid contacts the exhausted gas.

The vehicle is a mobile unit, so that the vehicle is required to carry a large amount of the NOx absorption liquid or to frequently have liquid exchange, if water or alkali aqueous solution is used as the NOx absorption liquid. This is because the NOx absorption density is low in water or alkali aqueous solution. Further, because water or alkali aqueous solution easily volatiles, the filling of liquid is frequently required.

In contrast, when the ionic liquid is used as the NOx absorption liquid, the amount of the liquid carried by the vehicle can be reduced. Further, due to the regeneration process, the frequency for exchange or filling of the liquid can be reduced.

In the conventional art, NOx absorption reduction type catalyst or urea selection reduction type catalyst are used for cleaning the NOx exhausted from the vehicle. However, because the temperature of exhausted gas is low at the engine start time or low-load drive time, the catalyst may not fully use the cleaning performance, so that the NOx may not appropriately be cleaned.

In contrast, the NOx is efficiently absorbable in the broad temperature range by the ionic liquid. The ionic liquid suitably cleans the NOx in the exhausted gas without being affected by the temperature of exhausted gas.

A method of separating and recovering nitrogen oxides from a gas mixture includes: contacting an ionic liquid that chemically absorbs the nitrogen oxides with the gas mixture; and recovering the ionic liquid after the contacting.

Thus, the size of the gas separation and recovery apparatus can be maintained as small, and the NOx contained in the gas mixture can be adequately separated and recovered.

Such changes and modifications are to be understood as being within the scope of the present disclosure as defined by the appended claims.

What is claimed is:

1. A gas separation and recovery method that separates and recovers nitrogen oxides from a gas mixture, the gas separation and recovery method comprising:
   contacting an ionic liquid with the gas mixture, the ionic liquid chemically absorbing the nitrogen oxides;
   recovering the ionic liquid after the contacting; and
   wherein the ionic liquid contains carboxylic salt.

2. The gas separation and recovery method according to claim 1, wherein
   the ionic liquid contains at least one sort of anion selected from a group consisting of C$_n$H$_{2n+1}$COO$^-$ (n is an integer of 0-10) and its derivative.

3. The gas separation and recovery method according to claim 1, further comprising:
   regenerating the ionic liquid recovered in the recovering step.

4. The gas separation and recovery method according to claim 1, wherein the gas mixture comprises gas exhausted from an engine of a vehicle.

5. The gas separation and recovery method according to claim 1, wherein the carboxylic salt comprises an alkyl carboxylate ion.

6. The gas separation and recovery method according to claim 5, wherein the carboxylic ion is chosen from the group consisting of acetate ion ($CH_3COO^-$), propionic acid ion ($CH_3CH_2COO^-$), butanoic acid ion ($CH_3(CH_2)_2COO^-$), octanoic acid ion ($CH_3(CH_2)_6COO^-$)₅ and decanoic acid ion ($CH_3(CH_2)_8COO^-$).

7. The gas separation and recovery method according to claim 1, wherein the carboxylic salt comprises a carboxylic ion chosen from the group consisting of $C_2H_3COO^-$, $C_3H_5COO^-$, $C_4H_7COO^-$, and $C_8H_{15}COO^-$.

8. The gas separation and recovery method according to claim 1, wherein the carboxylic salt comprises a benzoic acid ion ($C_6H_5COO^-$).

* * * * *